350-412

OR 3,904,275

United States

Noguchi et al.

[11] 3,904,275
[45] Sept. 9, 1975

[54] MECHANISM FOR FOCUSING DIFFERENTLY SPACED OBJECTS

[75] Inventors: Yoshiro Noguchi; Tsuneyo Metabi, both of Sakai, Japan

[73] Assignee: Minolta Camera Kabushiki Kaisha, Osaka, Japan

[22] Filed: May 6, 1974

[21] Appl. No.: 467,344

[30] Foreign Application Priority Data
May 10, 1973 Japan.............................. 48-55288

[52] U.S. Cl............. 350/175 FS; 350/186; 350/255
[51] Int. Cl.².............................................. G02B 9/00
[58] Field of Search....... 350/175 FS, 186, 194, 255

[56] References Cited
UNITED STATES PATENTS
2,537,912   1/1951   Reiss................................. 350/186

*Primary Examiner*—Ronald L. Wibert
*Assistant Examiner*—Paul K. Godwin
*Attorney, Agent, or Firm*—Wolder & Gross

[57] ABSTRACT

An objective lens includes a rear lens group carried by a first tube and a front lens group carried by a second tube, the tubes being coaxial with and extending in an outer tube. A focusing ring on the outside tube concurrently longitudinally adjusts the lens groups for primary focusing by way of a screw mechanism and an operating member longitudinally adjusts the front lens group while maintaining the rear lens group stationary to vary the objective lens field of curvature. In focusing a pair of longitudinally spaced objects on a focal plane the focusing ring is first adjusted to sharply focus one object and the operating member is then adjusted to sharply focus the other object.

7 Claims, 3 Drawing Figures

PATENTED SEP 9 1975 3,904,275
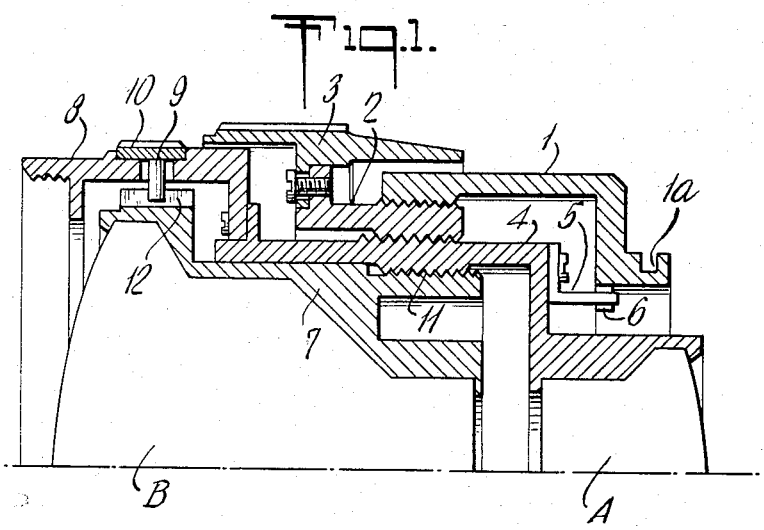
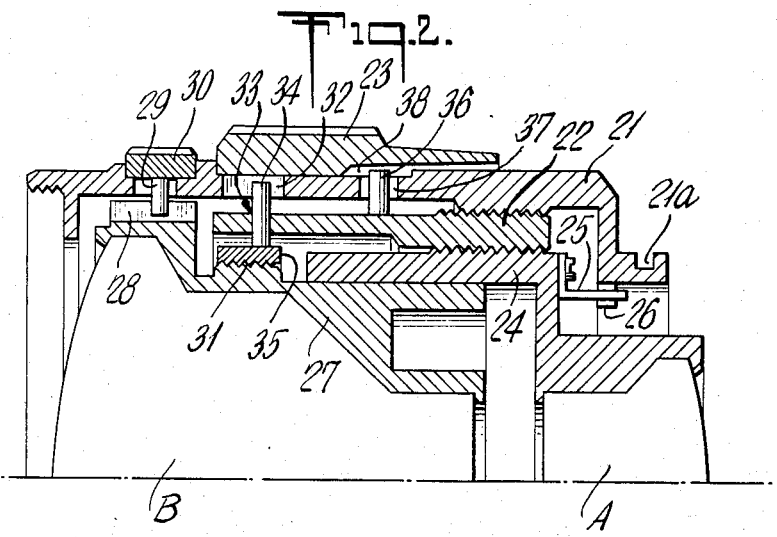
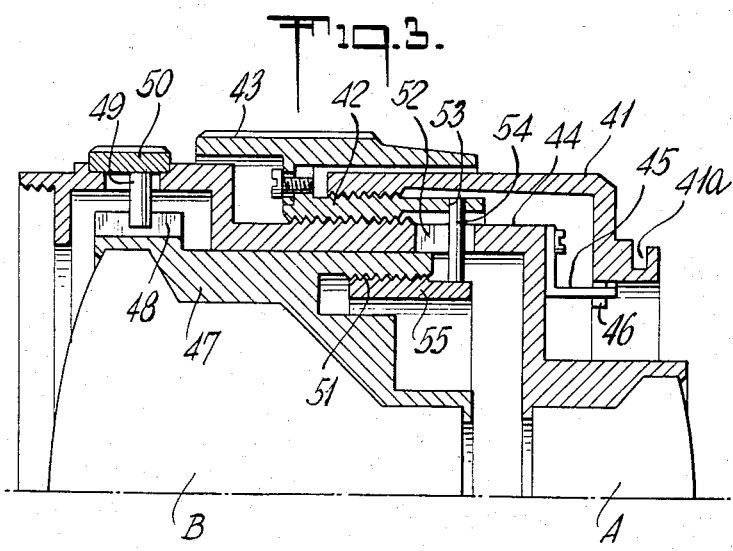

MECHANISM FOR FOCUSING DIFFERENTLY SPACED OBJECTS

BACKGROUND OF THE INVENTION

The present invention relates generally to improvements in objective lenses and it relates more particularly to an improved objective lens provided with a mechanism for adjusting the curvature of field of the objective lens.

Systems are known for modifying the curvature of field of a lens and are generally so designed as to focus on an image focal plane of a photosensitive film, a quite sharp or clear image of only a photographic object located at a preadjusted picture taking distance.

However, in practical photographing, the field to be photographed is three-dimensional, having certain depth. Furthermore, it is frequently desirable to produce a sharp, clear picture of at least two objects positioned in such a three-dimensional field at longitudinally differently spaced points from the objective lens.

Included by such cases is that a subject photographic of primary object is positioned in the center of the field at a certain distance from a photographer, while another or secondary object is positioned at a considerably greater or lesser distance than that of the subject or primary object, and offset to a corner portion of the field of view.

Hitherto, it has been a practice to take a picture of such objects by using a conventionally focused photographic objective lens. However, in the case where the difference in picture taking distance between the primary object and the secondary object exceeds the depth of field of the photographic objective lens, generally insurmountable difficulties are encountered in the focusing of both objects to produce desirably sharp and clear images thereof.

SUMMARY OF THE INVENTION

It is a principal object of the present invention to provide an improved method and mechanism for producing an image on a focal plane.

Another object of the present invention is to produce an improved method and mechanism for adjusting an objective lens system for selectively varying the focal length thereof for different areas of a field of view.

Still another object of the present invention is to provide an improved objective lens system having an adjustable curvature of field.

A further object of the present invention is to provide an improved objective lens mechanism wherein transversely spaced objects, whose difference in distances from the objective lens exceeds the depth of focus of the objective lens, may be focused as sharp and clear images on a flat focal plane.

Still a further object of the present invention is to provide a method and mechanism of the above nature which are simple, convenient, reliable and of great versatility and adjustability.

The above and other objects of the present invention will become apparent from a reading of the following description taken in conjunction with the accompanying drawings which illustrate preferred embodiments thereof.

In a sense, the present invention contemplates the provision of an objective lens in which the curvature of field is selectively adjustable. The objective lens includes front and rear axially spaced lens groups, a first means for concurrently axially adjusting the lens groups for principal focusing and a second means for axially adjusting the front lens group independently of the rear lens group for varying the field of curvature. In employing the improved objective lens in focusing into sharp images on a focal plane transversely offset primary and secondary objects whose difference in distance from the focal plane exceeds the depth of focus of the objective lens, the primary object is first sharply focused at the center of the field of view by adjusting the first means and the secondary object is then sharply focused at a side or corner of the field of view by adjusting the second means. Thus the primary object is focused in the normal manner and the secondary object is focused by adjusting the curvature of field.

The improved mechanism and method are highly versatile and of wide applicability, convenient and highly reliable.

BRIEF DESCRIPTION OF THE DRAWINGS

FIG. 1 is a medial longitudinal sectional view of an objective lens mechanism embodying the present invention which may be employed in practicing the method of the present invention;

FIG. 2 is a view similar to FIG. 1 of another embodiment of the present invention; and FIG. 3 is a view similar to FIG. 1 of still a further object of the present invention.

DESCRIPTION OF THE PREFERRED EMBODIMENTS

Referring now to the drawings, particularly FIG. 1 thereof which illustrates a preferred embodiment of the present invention the reference numeral 1 generally designates an outer tube or barrel formed with a bayonet mount 1a adapted to couple the objective lens or device to a camera body. An intermediate tube 2 is in threaded engagement with the inner peripheral wall of the outer tube 1, and also threadingly engages the outer peripheral wall of an inner tube 4 which carries a rear lens group A. A focus ring 3 is affixed to and rotatable with the intermediate tube 2 and is externally accessible. The outer tube 1 and inner tube 4 are intercoupled in a manner which restricts their relative movement only in the direction of an optical axis by means of a key 5 on inner tube 4 slidably engaging a longitudinal key way 6 on outer tube 1. The outer tube 1, intermediate tube 2 and inner tube 4 constitute a so-called linear of forward helical focusing mechanism by reason of their mutual threaded engagement and the engagement of key 5 with key way 6. The inner tube 4 has formed in its inner peripheral face screw threads 11 which mesh with mating screw threads formed in the outer peripheral face of a lens frame 7 carrying a front lens group B. A forwardly projecting tube 8 is rigidly affixed to the front portion of the inner tube 4, and an operating ring 10 is rotatably mounted thereon for modifying the curvature of the field of the objective lens. The operating ring 10 is provided with a pin 9 which projects radially inwardly into longitudinal sliding engagement with a groove 12 extending parallel to the direction of the optical axis in the front outer peripheral face of the frame 7. The outer peripheral face of the frame 7 partially telescopes the inner barrel 4.

In the operation of the above described arrangement, when the focusing ring 3 is rotated, the front lens group B and rear lens group A will both be advanced or retracted as a unit by means of the aforesaid forward helical focusing mechanism in the direction of the optical axis and without any change in the spacing between the lens groups A and B, as the case of ordinary focusing. However, when the operating ring 10 is rotated, only the frame 7 holding the front lens group B will be rotated due to its engagement with the longitudinal groove 12 by way of the pin 9. In other words, since the inner tube 4 holding the rear lens group A is prevented from rotating due to the engagement with the key 5 by way of the key way 6, only the frame 7 will advance or retract in the direction of the optical axis. The shifting of only the front lens group B relative to the rear lens group A effects a variation in the spacing between the lens groups A and B, thereby modifying the curvature of field.

The aforesaid modification in the curvature of field is utilized for focusing, for instance, two photographic objects to the same desired sharpness, said two photographic objects having a difference in distance from the lens which exceeds the depth of field. On the other hand, when it is desired that the picture of one of the objects of the two be taken with poor sharpness, then an unclear image may be intentionally obtained.

In the photographing operational procedure employing the objective lens device which has been described above, first a primary photographic object which is the subject of a view is located in the center thereof and then the focus ring 3 is rotated for sharply focusing the image of the object as the subject of the view. Thereafter a secondary object of a subsidiary subject located forwardly of rearwardly of the primary object is focused by varying the curvature of field by manipulating the operating ring 10. At this time, the primary object, which has been previously focused remains so focused. In this manner, the subject or primary object and the secondary object of the subsidiary subject, although having a considerable difference in distance from the objective lens may be both focused in a focusing plane at a desired sharpness.

FIG. 2 shows another embodiment of the present invention, wherein the principle of the present invention is applied to a lens system, in which upon focusing, the front lens group and rear lens group of a lens system move in different manners, i.e., in floating fashion. Specifically there is shown at 21 an outer cylinder or tube formed with a coupling portion 21a adapted to attach the objective lens device to a camera body, at 22 an intermediate cylinder mounted in threaded engagement with the inner peripheral face of the outer cylinder 21 at 23 a focus ring rotatably engaging the outer peripheral face of the outer cylinder 21, at 24 an inner cylinder carrying the rear lens group A, the inner cylinder 24 being in threaded engagement with the inner peripheral face of the intermediate cylinder 22. The outer cylinder 21 and the inner cylinder 24 are coupled in a manner to permit the relative movement thereof only in the direction of the optical axis by means of a key 25 projecting from inner cylinder 24 slidably engaging and a key way 26, while the outer cylinder, intermediate cylinder 22 and inner cylinder 24 constitute a so called linear extension mechanism by reason of their mutual threaded engagement and the longitudinal sliding engagement between key 25 and key way 26. The rear portion of a lens frame 27 carrying the front lens group B telescopes the inner cylinder 24 and has screw threads 31 formed midway on its outer peripheral face in the direction of the optical axis. An internally threaded ring 35 has a pin 34 extending radially outwardly and engaging a linear longitudinal slot 32 which is provided in the wall of the outer cylinder 21 and extends in the direction of an optical axis, the pin 34 also slidably engaging a helical slot 33 having a predetermined lead and formed in the wall of the intermediate cylinder 22. In addition, the threaded ring 35 engages the screw threads 31 on the lens frame 27.

The outer cylinder 21 extends forwardly and is provided at its front with a forwardly projecting cylinder portion and an operating ring 30 is rotatably mounted on the aforesaid projecting cylinder portion, the ring 30 functioning to modify the curvature of field. The operating ring 30 carries a pin 29 extending radially inwardly through an opening provided in the wall of the aforesaid projecting cylinder portion, and slidably engaging a longitudinal groove 28 extending in the direction of an optical axis and provided in the outer peripheral face of the lens frame 27. Projecting radially outwardly from the outer peripheral face of the intermediate cylinder 22 is a pin 36 which slidably engages a longitudinal groove 38 extending in the direction of the optical axis and formed in the inner peripheral face of the focusing ring 23, by way of an opening 37 in the wall of the outer cylinder 21. The opening 37 extends a considerable distance in the circumferential direction.

With the last described arrangement, when the focus ring 23 is rotated, the intermediate cylinder 22 is correspondingly rotated, such that the inner cylinder 24 longitudinally advances or retracts by means of the aforesaid forward helical focusing mechanism, and the rear lens group A as well longitudinally advances or retracts. On the other hand, the rotation of the intermediate cylinder 22 causes the pin 34 to longitudinally advance or retract without rotation under the guidance of the longitudinal slot 32 and helical slot 33, said pin 34 slidably engaging the linear slot 32 and the helical slot 33. Accordingly, the ring 35 integral with the pin 34 will advance or retract without rotation integrally with the lens frame 27.

The suitable selection of the relation of the lead of the helicoid screws and the lead of helical slot 33, by means of which the outer cylinder 21 intermediate cylinder 22 and inner cylinder 24 are intercoupled to move the front lens group B and rear lens group A in different manners while maintaining constant mutual relationship therebetween, due to the rotation of the focus ring 23. In other words, so called floating operation is effected.

After focusing in accordance with the aforesaid floating operation, when the curvature of field is desired to be modified, the operating ring 30 is rotated. In other words, when the operating ring 30 is rotated, the frame 27 will be rotated by way of pin 29 and groove 28, to advance or retract depending on the threading engagement with the threaded ring 35 which is maintained stationary. As a result, only the front lens group B is advanced or retracted, varying the spacing between the front and rear lens groups A and B. This in turn modifies a curvature of field.

In FIG. 3 there is illustrated another embodiment of the present invention which differes from that of FIG. 2 in that the inner cylinder is formed at its front with a forwardly projecting cylinder portion. Specifically an outer cylinder 41 has coupling portion 41a adapted to mount the device on the camera body. An intermediate cylinder 42 has an outer peripheral face which threadingly engages the inner peripheral face of the outer cylinder 41. In addition, the inner peripheral face of the intermediate cylinder 42 threadingly engages the outer peripheral face of an inner cylinder 44 carrying the rear lens group A. The outer cylinder 41, intermediate cylinder 42 and inner cylinder 44 constitute the so-called linear helical focusing mechanism by reason of their mutual threading engagement and the longitudinal sliding engagement between a key 45 on cylinder 44 and a key way 46 on cylinder 41. A focus ring 43 is mounted on the intermediate cylinder 42 and a lens frame 47 carries the front lens group B, the rear outer peripheral face of the lens frame 47 threadingly engaging the inner peripheral face of the inner cylinder 44.

The inner peripheral surface of the lens frame 47 threadingly engages an externally threaded ring 55. Projecting radially outwardly from the threaded ring 55 is a pin 54 which slidably engages both a helical slot 53 provided in the wall of the intermediate cylinder 42 and a linear groove 52 provided in the wall of the inner cylinder 44. The front of the inner cylinder 44 is formed with a forwardly projecting front cylinder portion. An operating ring 50 is rotatably mounted on the aforesaid front projecting cylinder portion and serves to modify the lens curvature of field. The operating ring 50 is provided with a pin 49 which projects radially inwardly through an opening in the wall of the projecting front cylinder portion into sliding engagement with a longitudinal groove 48 provided in the outer peripheral face of the lens frame 47.

With the arrangement last described, when the focus ring 43 is rotated, the inner cylinder 44 advances or retracts in the direction of an optical axis without rotation by operation of the aforesaid forward helical focusing mechanism, and the rear lens group A carried by the inner cylinder 44 advances or retracts therewith. On the other hand, the front lens group B advances or retracts in the direction of the optical axis without rotation under the guidance of the pin 54 but integrally with the lens frame 47 and threaded ring 55, the aforesaid pin 54 being restricted in its movement by means of helical slot 53 and linear slot 52.

Like in the previous embodiment, the front lens group and the rear lens group move in different manners, while maintaining a constant relationship therebetween, i.e., following the so-called floating operation. Also, like in the earlier embodiments, the rotation of the operating ring 50 causes only the front lens group B to move thus modifying the lens system curvature of field.

While there have been described and illustrated preferred embodiments of the present invention, it is apparent that numerous alterations, omissions and additons may be made without departing from the spirit thereof.

We claim:

1. A mechanism for modifying curvature of field formed by an objective lens including a front lens group and a rear lens group, the device comprising:
    an outer tube mountable on a camera body;
    a first tube provided within said outer tube and moveable along the optical axis of said objective lens and carrying said rear lens group;
    a second tube provided within said outer tube and moveable along the optical axis of said objective lens and carrying said front lens group;
    a focus ring rotatably provided on the outer peripheral wall of said outer tube;
    a third tube provided within said outer tube and moveable along the optical axis of said objective lens;
    a first means for moving both said first and second tubes with an air space varied therebetween in response to the rotation of said focus ring;
    an operating member rotatably provided on the outer peripheral wall of said outer tube; and
    a second means for moving only said first tube with an air space varied between said first and second lens groups in response to the rotation of said operating member.

2. A mechanism for modifying curvature of field formed by an objective lens including a front lens group and a rear lens group, the device comprising:
    an outer tube mountable on a camera body;
    a first tube provided within said outer tube and moveable along the optical axis of said objective lens and carrying said rear lens group;
    a second tube provided within said outer tube and moveable along the optical axis of said objective lens and carrying said front lens group;
    a focus ring rotatably provided on the outer peripheral wall of said outer tube;
    a third tube provided within said outer tube and moveable along the optical axis of said objective lens;
    a first means for moving both said first and second tubes with an air space varied therebetween in response to the rotation of said focus ring;
    an operating member rotatably provided on the outer peripheral wall of said first tube; and
    a second means for moving only said first tube with an air space varied between said first and second lens groups in response to the rotation of said operating member.

3. A mechanism as set forth in claim 2, wherein said operating means is spaced from said focus ring.

4. A mechanism as set forth in claim 2, wherein said first tube engages said second tube.

5. A mechanism as set forth in claim 2, wherein said third tube is disposed between said outer and first tubes and is in threaded engagement with confronting faces of said outer and first tubes and is connected to and rotatable with said focus ring.

6. A mechanism as set forth in claim 2, wherein said second means includes a pin projecting radially inwardly from said operating member and a groove longitudinally formed in said second tube and engaged by said pin.

7. A mechanism as set forth in claim 2 comprising a fourth tube in threaded engagement with an inside peripheral face of said second tube and connected to and moveable with said third tube.

* * * * *